United States Patent
Ikemoto

(10) Patent No.: US 10,006,765 B2
(45) Date of Patent: Jun. 26, 2018

(54) DEPTH DETECTION APPARATUS, IMAGING APPARATUS AND DEPTH DETECTION METHOD

(71) Applicant: CANON KABUSHIKI KAISHA, Tokyo (JP)

(72) Inventor: Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/527,424

(22) PCT Filed: Nov. 13, 2015

(86) PCT No.: PCT/JP2015/005674
§ 371 (c)(1),
(2) Date: May 17, 2017

(87) PCT Pub. No.: WO2016/079965
PCT Pub. Date: May 26, 2016

(65) Prior Publication Data
US 2017/0322023 A1    Nov. 9, 2017

(30) Foreign Application Priority Data
Nov. 21, 2014 (JP) .................................. 2014-236881

(51) Int. Cl.
*H04N 5/232* (2006.01)
*G01C 3/06* (2006.01)
(Continued)

(52) U.S. Cl.
CPC .................. *G01C 3/06* (2013.01); *G06T 7/50* (2017.01); *H04N 5/2353* (2013.01);
(Continued)

(58) Field of Classification Search
CPC .................................................. H04N 5/23212
(Continued)

(56) References Cited

U.S. PATENT DOCUMENTS 8,488,956 B2  7/2013  Tamaki
8,872,962 B2  10/2014  Fukuda
(Continued)

FOREIGN PATENT DOCUMENTS

JP    2012/037550 A    2/2012
JP    2014-029393 A    2/2014
(Continued)

OTHER PUBLICATIONS

PCT/IB/326 (PCT Notification Concerning Transmittal of International Preliminary Report on Patentability).
(Continued)

*Primary Examiner* — Joel Fosselman
(74) *Attorney, Agent, or Firm* — Cowan, Liebowitz & Latman, P.C.

(57) ABSTRACT

A depth detection apparatus that detects depth information on a depth to an object on the basis of first and second signals corresponding to first and second pupil regions of an exit pupil, including: a first calculation unit that calculates a first shift amount between the first and second signals; a signal processing unit that generates a corrected signal by performing filter processing on at least one of the first and second signals, the filter processing being performed to relatively displace the first and second signals by a displacement amount corresponding to the first shift amount; and a second calculation unit that calculates a second shift amount between the filtered first and second signals or between signals, one of which is filtered in the filter processing and the other one of which is unfiltered.

15 Claims, 9 Drawing Sheets

(51) Int. Cl.
*G06T 7/50* (2017.01)
*H04N 5/369* (2011.01)
*H04N 5/235* (2006.01)

(52) U.S. Cl.
CPC ..... *H04N 5/23212* (2013.01); *H04N 5/23293* (2013.01); *H04N 5/3696* (2013.01)

(58) Field of Classification Search
USPC ...................................................... 348/222.1
See application file for complete search history.

(56) References Cited

U.S. PATENT DOCUMENTS

| | | | |
|---|---|---|---|
| 2009/0284627 A1* | 11/2009 | Bando | G06K 9/00201 348/273 |
| 2011/0085786 A1 | 4/2011 | Tamaki | |
| 2015/0176976 A1 | 6/2015 | Nobayashi | |

FOREIGN PATENT DOCUMENTS

| | | |
|---|---|---|
| JP | 2014-153494 A | 8/2014 |
| JP | 5606208 B2 | 10/2014 |
| WO | 2012/018102 A1 | 2/2012 |
| WO | 2014/021147 A1 | 2/2014 |

OTHER PUBLICATIONS

PCT/IB/373 (PCT International Preliminary Report on Patentability).
PCT/ISA/237 (PCT Written Opinion of the International Searching Authority).
The above US Publication 1 and Foreign references 1, 3, and 5 were cited in the International Search Report of the corresponding International Application, PCT/JP2015/005674 dated Feb. 2, 2016, which is enclosed.
The Apr. 16, 2018 Korean Notice of Allowance that issued in Korean Patent Application No. 10-2017-7016548.

* cited by examiner

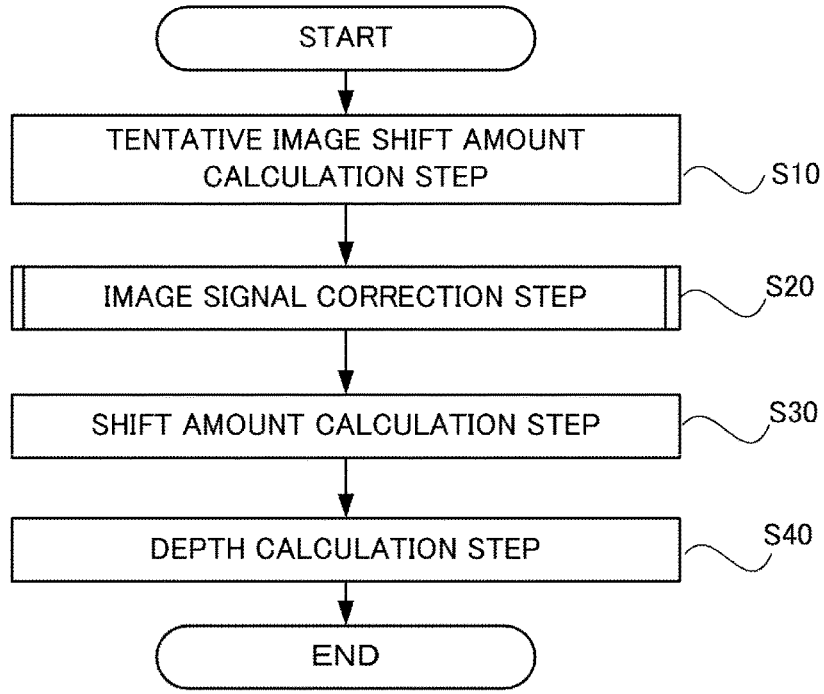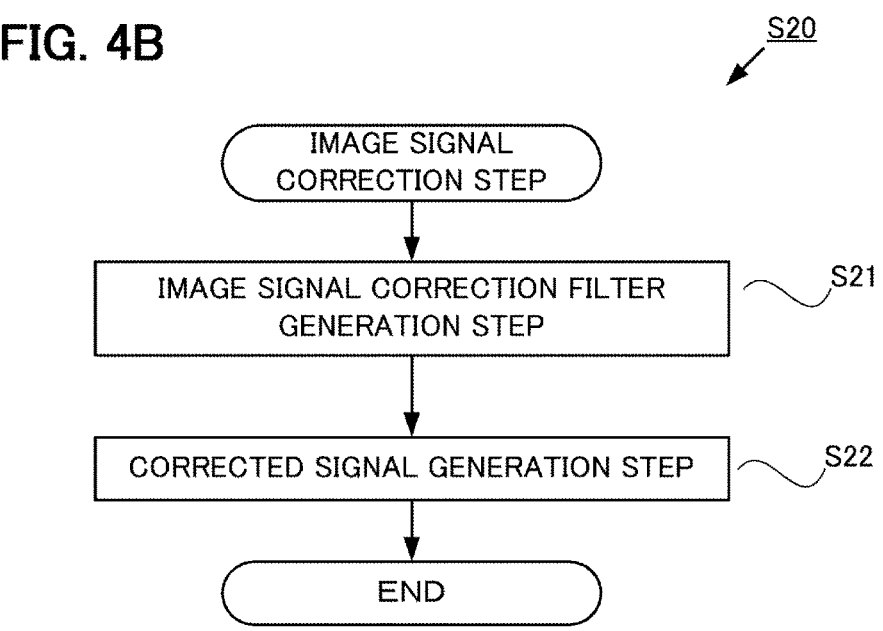

DEPTH DETECTION APPARATUS, IMAGING APPARATUS AND DEPTH DETECTION METHOD

CROSS-REFERENCE TO RELATED APPLICATIONS

This application claims priority to International Application No. PCT/JP2015/005674 filed on Nov. 13, 2015, the entire disclosure of which is hereby incorporated by reference.

TECHNICAL FIELD

The present invention relates to a depth detection apparatus, an imaging apparatus and a depth detection method.

BACKGROUND ART

As a depth detection technique that can be applied to a digital camera, a depth detection technique to detect a depth to an object by a phase difference method, with providing a depth measurement function to a part or all of the pixels of an imaging device, is known. A pixel having the depth measurement function (hereafter called "depth measurement pixel") includes a plurality of photoelectric conversion units which receives luminous flux that passed different regions on a pupil of an imaging optical system respectively. The depth is measured by estimating a shift amount of the image signal generated by each conversion unit, and converting the shift amount into a defocus amount using a conversion coefficient.

A cause of a drop in the depth measurement accuracy is the change of profile of an image signal generated by each photoelectric conversion unit. If the image signal generated by each photoelectric conversion unit has a mutually different profile, due to the vignetting of luminous flux caused by a frame of the optical system or the like, and the difference of sensitivity characteristics among the pixels, the accuracy of estimating the shift amount of the image signal drops, and depth measurement accuracy drops as well. Patent Literature 1 discloses a method for correcting the profile of the image by performing image signal correction filtering on the image signal, whereby the detection accuracy of the shift amount is improved.

Another cause of a drop in the depth measurement accuracy is fluctuation of the conversion coefficient. The conversion coefficient fluctuates depending on a defocus amount and a position on the imaging device for which depth is measured. If the shift amount is converted into the defocus amount using a fixed conversion coefficient regardless the depth measurement conditions, a conversion error occurs. Patent Literature 2 discloses a method for reducing the depth calculation error by calculating the conversion coefficient according to the value of the defocus amount.

CITATION LIST

Patent Literature

[PTL1] Japanese Patent Application Laid-Open No. 2012-037550

[PTL2] Japanese Patent Application Laid-Open No. 2014-029393

SUMMARY OF INVENTION

Technical Problem

If both the image signal correction processing and the conversion coefficient calculation processing are performed, the processing time to implement depth measuring computation increases, and the depth measurement speed drops. With the foregoing in view, it is an object of the present invention to provide a method that allows measuring a depth at high-speed and high precision.

Solution to Problem

A depth detection apparatus according to the present invention is a depth detection apparatus that detects depth information on a depth to an object on the basis of a first signal corresponding to luminous flux that passed through a first pupil region of an exit pupil of an imaging optical system and a second signal corresponding to luminous flux that passed through a second pupil region, which is different from the first pupil region, the depth detection apparatus including: a first calculation unit adapted to calculate a first shift amount, which is a positional shift amount between the first signal and the second signal; a signal processing unit adapted to generate a corrected signal by performing filter processing on at least one of the first signal and the second signal, the filter processing being performed to relatively displace the first signal and the second signal by a displacement amount corresponding to the first shift amount; and a second calculation unit adapted to calculate a second shift amount, which is a positional shift amount between the first signal and the second signal, which are both filtered in the filter processing, or between signals, one of which is filtered in the filter processing and the other one of which is unfiltered.

A depth detection method according to the present invention is a depth detection method performed by a depth detection apparatus that detects depth information on a depth to an object on the basis of a first signal corresponding to luminous flux that passed through a first pupil region of an exit pupil of an imaging optical system, and a second signal corresponding to luminous flux that passed through a second pupil region which is different from the first pupil region, the depth detection method including: a first calculation step of calculating a first shift amount, which is a positional shift amount between the first signal and the second signal; a signal processing step of generating a corrected signal by performing filter processing on at least one of the first signal and the second signal, the filter processing being performed to relatively displace the first signal and the second signal by a displacement amount corresponding to the first shift amount; and a second calculation step of calculating a second shift amount between the first signal and the second signal, which are both filtered in the filter processing, or between signals one of which is filtered in the filter processing and the other one of which is unfiltered.

Further features of the present invention will become apparent from the following description of exemplary embodiments with reference to the attached drawings.

Advantageous Effects of Invention

According to the present invention, a depth detection apparatus and a depth detection method that allows to measure a depth at high speed and high precision can be provided.

BRIEF DESCRIPTION OF DRAWINGS

FIG. 4A and FIG. 4B are flow charts depicting exemplary processes in a depth detection method according to Embodiment 1.

DESCRIPTION OF EMBODIMENTS

In the following description, a digital still camera is used as an example of an imaging apparatus having a depth detection apparatus according to the present invention, but application of the present invention is not limited to a digital still camera. For example, the depth detection apparatus according to the present invention can also be applied to a digital video camera, a digital depth meter or the like.

In the description with reference to the drawings, a same segment is denoted with a same reference symbol, even if a drawing number is different, and redundant description is minimized.

(Embodiment 1)
<Depth Detection Apparatus>

Figure 1A:
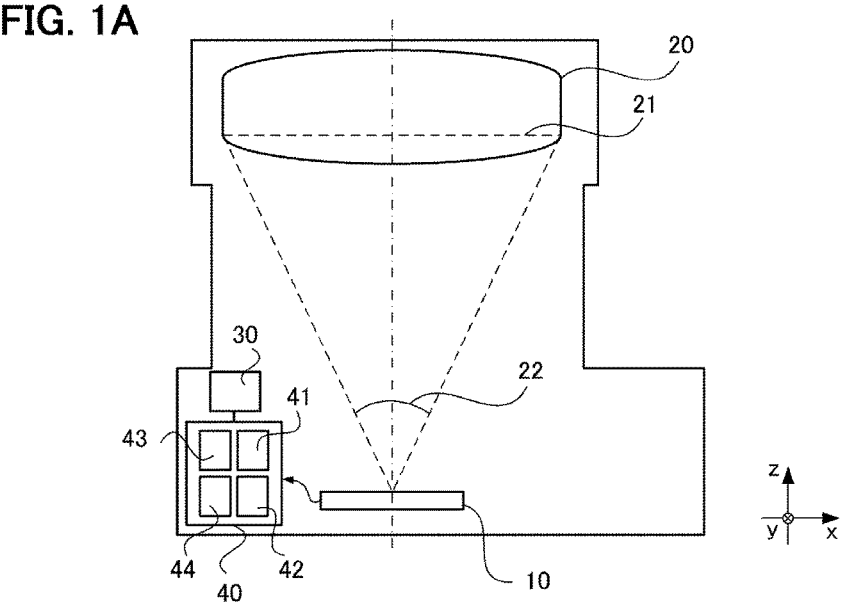
FIG. 1A is a schematic diagram depicting an example of an imaging apparatus having a depth detection apparatus according to Example 1.

FIG. 1A is a schematic diagram of an imaging apparatus having a depth detection apparatus 40 according to the present embodiment. This imaging apparatus has an imaging device 10, an imaging optical system 20 and a recording apparatus 30, besides the depth detection apparatus 40. Furthermore, the imaging apparatus has a driving mechanism for focusing of the imaging optical system 20, a shutter, an ornamental image generation unit, and a display for imaging confirmation (e.g. liquid crystal display).

Figure 1B:
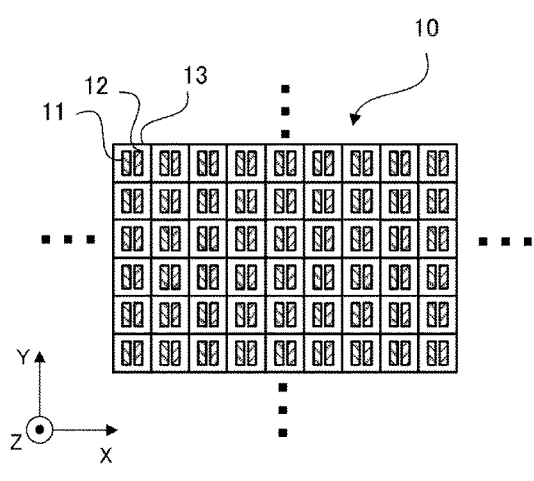
FIG. 1B is a schematic diagram depicting an example of an imaging device.

FIG. 1B is a schematic diagram depicting an example of the imaging device 10. The imaging device 10 has a plurality of depth measurement pixels 13 which includes photoelectric conversion units 11 and 12 (hereafter the depth measurement pixel is also called a "pixel"). In concrete terms, a solid-state imaging device, such as a CMOS sensor (sensor using a complementary metal-oxide semiconductor) and a CCD sensor (sensor using a charge coupled device) can be used as the imaging device 10. A position on the imaging device is called an "image height", and a position near the center and a position near the periphery of the imaging device 10 are called a "center image height" and a "peripheral image height".

Figure 1C:
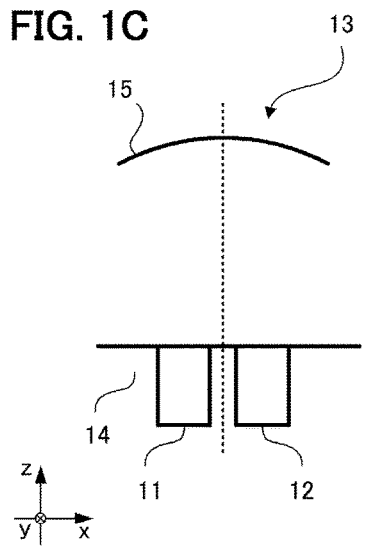
FIG. 1C is a cross-sectional schematic diagram depicting an example of a pixel.

FIG. 1C is a schematic cross-sectional schematic diagram depicting an example of the pixel 13. The photoelectric conversion units 11 and 12 of the pixel 13 are formed inside a substrate 14. The pixel 13 includes a micro lens 15.

As shown in FIG. 1, the imaging optical system 20 forms an image of an object located outside the imaging apparatus on the surface of the imaging device 10. The imaging device 10 acquires luminous flux that passed through an exit pupil 21 of the imaging optical system 20 by the photoelectric conversion unit 11 or photoelectric conversion unit 12 of the pixel 13 via the micro lens 15, and converts the received luminous flux into an electric signal. In concrete terms, luminous flux that passed through a first pupil region 81 (FIG. 2B) of the exit pupil 21 is converted into an electric signal by the photoelectric conversion unit 11 of each pixel 13. Luminous flux that passed through a second pupil region 82 (FIG. 2C), which is different from the first pupil region of the exit pupil 21, is converted into an electric signal by the photoelectric conversion unit 12 of each pixel 13. The pixel 13 includes a floating diffusion (FD) unit, a gate electrode, wiring and the like to output the electric signal to the depth detection apparatus 40.

The depth detection apparatus 40 has a depth calculation unit 41 that calculates a depth to an object based on a first signal $S_1$ corresponding to luminous flux that passed through the first pupil region 81 of the exit pupil 21 of the imaging optical system 20, and a second signal $S_2$ corresponding to luminous flux that passed through the second pupil region 82. The depth detection apparatus 40 is constituted by a signal processing substrate, for example, which includes a CPU and a memory, and implements the functions thereof by the CPU executing a program. The signal processing substrate can be constructed using an integrated circuit on which semiconductor devices are integrated, and can be constituted by an IC, LSI, system LSI, microprocessing unit (MPU), central processing unit (CPU) and the like.

The first signal $S_1$ is a set of each electric signal generated by the photoelectric conversion unit 11 of each pixel 13. In the first signal $S_1$, a position of each pixel 13 on the imaging device and each electric signal generated by the photoelectric conversion unit 11 of each pixel 13 are linked. The second signal $S_2$ is a set of each electric signal generated by the photoelectric conversion unit 12 of each pixel 13. In the second signal $S_2$, a position of each pixel 13 on the imaging device and each electric signal generated by the photoelectric conversion unit 12 of each pixel 13 are linked.

The depth detection apparatus 40 has a signal processing unit 42, a shift amount calculation unit 43 and a filter generation unit 44, besides the depth calculation unit 41. The signal processing unit 42 has a function to filter either one of the first signal $S_1$ and the second signal $S_2$ using a filter (digital filter) based on an optical transfer function corresponding to the first signal $S_1$ and an optical transfer function corresponding to the second signal $S_2$. The shift amount calculation unit 43 has a function to calculate the positional shift amount between two image signals. For example, the shift amount calculation unit 43 calculates a shift amount between the first signal $S_1$ and the second signal $S_2$ (first shift amount), or calculates a shift amount between the first signal $CS_1$ and the second signal $CS_2$ after performing the later mentioned filter processing (second shift amount). The filter generation unit 44 has a function to generate a filter to be used for filter processing by the signal processing unit 42, based on the shift amount calculated by the shift amount calculation unit 43. The recording apparatus 30 has a function to record a read signal or an operation result.

The pixel 13 is constituted by a plurality of photoelectric conversion units 11 and 12, hence an image signal equivalent to a signal obtained in the case when the pixel 13 is constituted by a single photoelectric conversion unit can be generated by adding the signals acquired by the photoelectric conversion units 11 and 12. Such a pixel 13 may be disposed for all the pixels of the imaging device 10, or the imaging device 10 may have both pixels having a single photoelectric conversion unit and pixels 13 having a plurality of photoelectric conversion units. In the latter configuration, the depth can be measured using the pixels 13 and an image of the object can be acquired using the rest of the pixels. The pixels 13 may be discretely disposed in the imaging device 10, or may be disposed at different intervals in the X direction and the Y direction.

<Depth Detection Method>

In this embodiment, the distance between the imaging optical system 20 and the imaging device 10 is long with respect to the size of the pixel 13. Therefore the luminous fluxes that passed through different positions on the exit pupil 21 of the imaging optical system 20 enter the surface of the imaging device 10 as luminous fluxes at different incident angles. The luminous fluxes within a predetermined angle range 22 (FIG. 1A) enter the photoelectric conversion units 11 and 12 according to the shape of the exit pupil 21 and the image height (position on the imaging device to which the luminous flux reaches). The sensitivity distribution on the exit pupil generated by projecting the sensitivity characteristics of the photoelectric conversion units 11 and 12 with respect to the entered luminous fluxes onto the exit pupil according to the angle is called "pupil transmittance distribution". The centroid of the pupil transmittance distribution in this case is called "pupil centroid". The pupil gravity center can be calculated by the following Expression 1. In Expression 1, r denotes a coordinate on the exit pupil 21, t denotes the pupil transmittance distribution of the photoelectric conversion unit 11 or 12, and the integration range is a region on the exit pupil 21.

[Math. 1]

$$g = \frac{\int r \cdot t(r) dr}{\int t(r) dr} \quad \# \tag{1}$$

Out of the region on the exit pupil 21 where the luminous flux received by each photoelectric conversion unit passes through, a region which includes the pupil gravity center and in which sensitivity of the corresponding photoelectric conversion unit is higher than a predetermined threshold is called "pupil region". The direction connecting the pupil gravity centers of the two pupil regions is called "pupil dividing direction", and the length between the pupil gravity centers is called "base line length". In this embodiment, the pupil dividing direction is the x direction, and this direction is regarded as the first direction, and the y direction which is perpendicular to the x direction is regarded as the second direction.

Figure 2A:
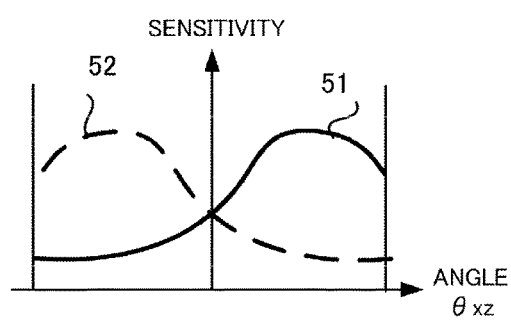
FIG. 2A to FIG. 2C are diagrams depicting the sensitivity characteristic of a depth measurement pixel and a pupils region.

FIG. 2A shows the sensitivity characteristic 51 of the photoelectric conversion unit 11 and the sensitivity characteristic 52 of the photoelectric conversion unit 12 with respect to the luminous flux that enters the xz plane. The abscissa indicates an angle formed by the incident luminous flux that entered the xz plane and the z axis, and the ordinate indicates the sensitivity.

Figure 2B:
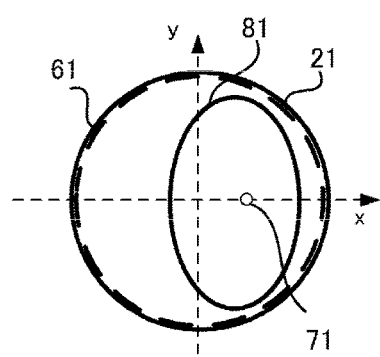

FIG. 2B is a diagram depicting the exit pupil 21 of the imaging optical system 20, and the pupil transmittance distribution 61, the pupil gravity center 71 and the pupil region 81 (first pupil region) corresponding to the photoelectric conversion unit 11. The pupil region 81 is a pupil region which is decentered from the center of the exit pupil 21 in the +x direction (first direction). The photoelectric conversion unit 11 of each pixel 13 is configured to receive the luminous flux that passed primarily through the pupil region 81. By this configuration, the first signal $S_1$, corresponding to the luminous flux that passed through the pupil region 81, is acquired.

Figure 2C:
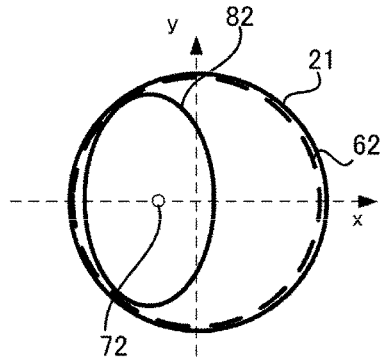

FIG. 2C is a diagram depicting the exit pupil 21 of the imaging optical system 20, and the pupil transmittance distribution 62, the pupil gravity center 72 and the pupil region 82 (second pupil region) corresponding to the photoelectric conversion unit 12. The pupil region 82 is a pupil region which is decentered from the center of the exit pupil 21 in the −x direction (second direction). The photoelectric conversion unit 12 of each pixel 13 is configured to receive the luminous flux that passed primarily through the pupil region 82. By this configuration, the second signal $S_2$, corresponding to the luminous flux that passed through the pupil region 82, is acquired.

The signals $S_1$ and $S_2$ can be expressed by the following Expression 2.

[Math. 2]

$$\begin{aligned} S_j &= f * PSF_j \\ &= FFT^{-1}[FFT[f] \cdot OTF_j] \\ &= FFT^{-1}[FFT[f] \cdot MTF_j \cdot \exp(i \cdot PTF_j)] \end{aligned} \tag{2}$$

f denotes a light quantity distribution of the object, and * denotes convolutional integration. Subscript j indicates 1 or 2. $PSF_j$ and $OTF_j$ denote transfer functions that indicate the deterioration degree caused by the imaging optical system 20 or the imaging device 10 when the luminous flux from the object is acquired as signal $S_j$ in the real space region and the spatial frequency region respectively, and are called a "point spread function" and an "optical transfer function" respectively. FFT denotes a Fourier transform, and FFT[f] is a Fourier-transformed light quantity distribution f of the object. $FFT^{-1}$ indicates an inverse Fourier transform.

Figure 3A:
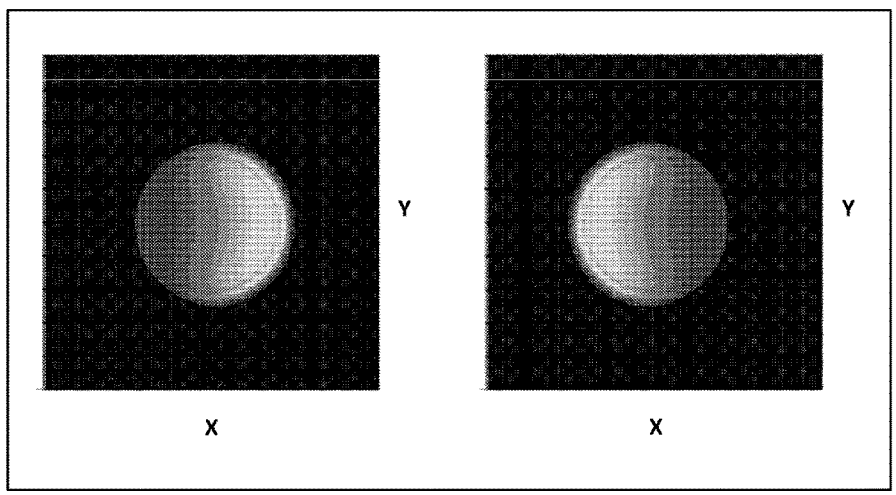
FIG. 3A and FIG. 3B are diagrams depicting a point spread function.
Figure 3B:
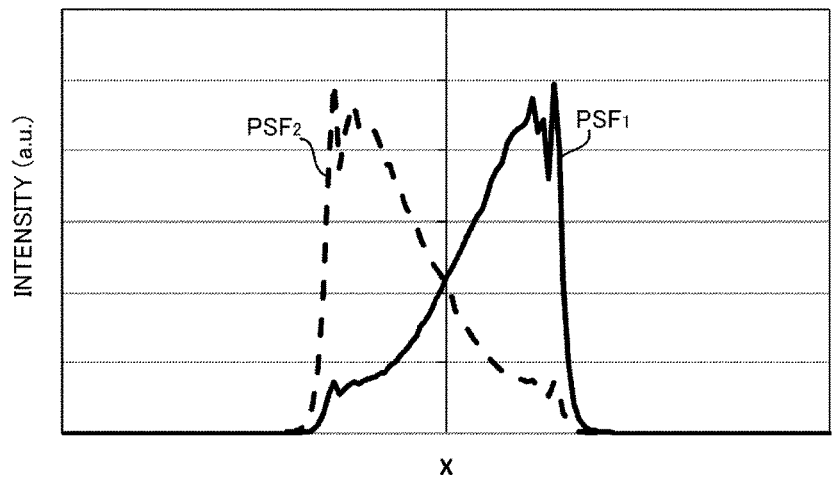

$OTF_j$ is expressed as a function that has an modulation function $MTF_j$ as an amplitude term, and a phase transfer function $PTF_j$ as a phase term in the spatial frequency region ($OTF_j=MTF_j \times \exp(iPTF_j)$). $MTF_j$ and $PTF_j$ are functions that determine the amount of change of the amplitude and the position of each spatial frequency component caused by a transfer respectively. If the vignetting of the luminous flux generated by the frame of the optical system or the like and the sensitivity characteristic of the pixel 13 are changed, $PSF_1$ and $PSF_2$ or $MTF_1$ and $MTF_2$, or $PTF_1$ and $PTF_2$ become functions having mutually different profiles respectively. FIG. 3A shows $PSF_1$ and $PSF_2$, where the ordinate and the abscissa indicate the x coordinate and the y coordinate respectively, and where color is expressed whiter as the value is greater. FIG. 3B is a cross-sectional view of each PSF in the x direction. Since $PSF_1$ and $PSF_2$ are different, as shown in FIG. 3A and FIG. 3B, the signals $S_1$ and $S_2$ have different profiles, and therefore error is easily generated when the shift amount is calculated.

FIG. 4 shows flow charts depicting exemplary processes of the depth detection method to detect the depth to an object, which is performed by the depth detection apparatus

40. The depth detection method has a shift amount calculation step, a signal processing step, and a depth calculation step.

<Tentative Shift Amount Calculation Step>

First as shown in FIG. 4A, the shift amount calculation unit 43 calculates a tentative shift amount from the first signal $S_1$ and the second signal $S_2$ (step S10). The signal shift amount of the signals $S_1$ and $S_2$ in the x direction (first direction) is determined by a known method. For example, the correlation operation is performed while shifting one of a pair of signals ($S_1$ and $S_2$) in the x direction, and the shift amount when correlation is highest is determined. The shift amount calculation unit 43 that executes the tentative shift amount calculation step S10 corresponds to the first calculation unit according to the present invention.

<Image Signal Correction Step>

Then, as shown in FIG. 4A, the signal processing unit 42 performs the image signal correction processing on the signals $S_1$ and $S_2$ (step S20). As a result of step S20, the corrected signals $CS_1$ and $CS_2$ are generated. FIG. 4B shows details of the image correction processing S20. The image correction processing S20 is constituted by a filter generation step to correct image signals (step S21), and a corrected signal generation step (step S22). In step S21, the filter generation unit 44 generates an image signal correction filter based on the value of the tentative shift amount calculated in step S10. For example, the filter generation unit 44 holds filter data (cell values) corresponding to each condition in advance, and calls up file data corresponding to the tentative shift amount calculated in step S10, whereby the image signal correction filter is generated. Then the signal processing unit 42 generates the corrected signals $CS_1$ and $CS_2$ by performing convolutional integration on the signals $S_1$ and $S_2$ using the image signal correction filter generated in step S21.

The filter used for this processing has Ax number of cells in the x direction, and Ay number of cells in the y direction (Ax and Ay are 1 or greater integers). The filter is created based on the optical transfer function OTF. In concrete terms, a filter $ICF_1$ used for the signal $S_1$ is expressed as a function adding a reciprocal of $OTF_1$ and the phase components $PG_1$ and $FPP_1$ in the frequency space. The filter $ICF_2$ used for the signal $S_2$ is expressed as a function adding a reciprocal of $OTF_2$ and the phase components $PG_2$ and $FFP_2$ in the frequency space. The filter ICF is expressed by the following Expressions 4 to 7. Subscript j indicates 1 or 2.

[Math. 3]

$$ICF_j = FFT^{-1}[FM_j \cdot \exp(i \cdot FP_j)] \quad (4)$$

$$FM_j = 1/MTF_j \quad (5)$$

$$FP_j = FPS_j + FPP_j \quad (6)$$

$$FPS_j = -PTF_j + PG_j \quad (7)$$

$FM_j$ and $FP_j$ are an amplitude term and a phase term of $ICF_j$ in the frequency space. The phase term $FP_j$ has a component $FPS_j$ (first phase component) to deform the image signal, and a component $FPP_j$ (second phase component) to displace the image signal. $FPS_j$ is a component having a different value in the real space depending on the spatial frequency, and is a component to correct a profile. $PG_j$ is a component generated by converting the moving amount of the gravity center position of $PSF_j$ caused by defocus into a phase amount with respect to each spatial frequency, and is a component that does not influence the profile of a signal. $PG_j$ is added to offset the positional change amount included in $PTF_j$ of the deformation component $FPS_j$. $FPP_j$ is a component having a constant value in the real space regardless the spatial frequency, and is a component to correct the position. $FPP_j$ is generated according to the relationship between the defocus amount and the shift amount in the depth detection apparatus 40, and the conversion coefficient which is used in the later mentioned depth calculation step. Expressions 4 to 7 may be transformed into other expression forms. Any transformed expression is included in the embodiment of the filter according to the present invention.

As mentioned above, the filter is determined according to the depth measurement conditions. The filter generation unit 44 holds filter data corresponding to each condition in advance, and acquires ICF by reading the filter data corresponding to the condition. The filter generation unit 44 may hold only filter data that corresponds to representative tentative shift amounts, and may generate a filter for a tentative shift amount other than the representative tentative shift amounts by interpolating the file data held in advance. Further, the filter generation unit 44 may approximate the filter data to a function and hold each coefficient of the function. For example, the cell value of the filter is approximated as a polynomial of which variable is a position in the filter, and the filter generation unit 44 holds each coefficient of the function (polynomial). Then the filter generation unit 44 reads the coefficient according to the depth measurement condition, and creates the filter. By this method, the filter data volume to be held can be reduced, and the recording capacity to hold the filter can be decreased.

The corrected signal $CS_j$ is expressed by Expression 8 using Expression 2 and Expressions 4 to 7.

[Math. 4]

$$CS_j = S_j * ICF_j = FFT^{-1}[FFT[f] \cdot \exp\{i(PG_j + FPP_j)\}] \quad (8)$$

The signal $CS_j$ is given by Expression 9 if the point spread function $CPSF_j$, generated by transforming $PSF_j$, is used. The profile of $CPSF_j$ determines the profile of the corrected signal $CS_j$.

[Math. 5]

$$CS_j = f * CPSF_j \quad (9)$$

Figure 5A:
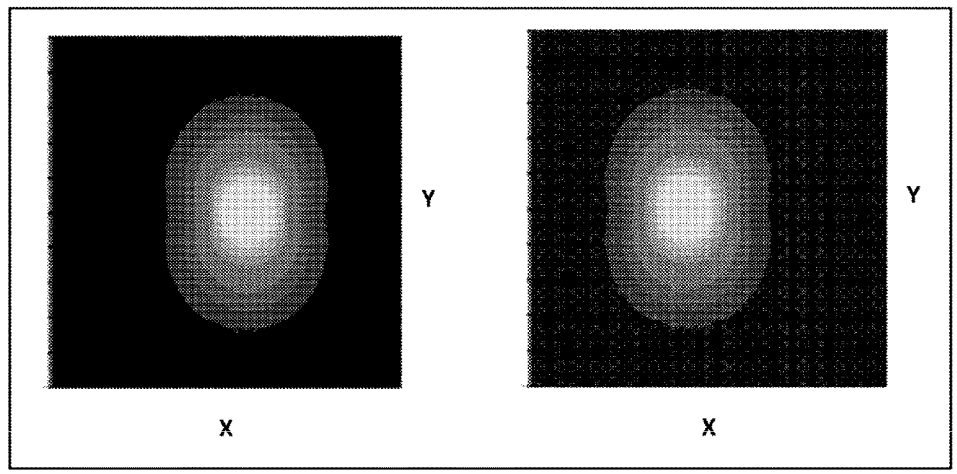
FIG. 5A and FIG. 5B are diagrams depicting a modified point spread function by performing signal correction processing according to Embodiment 1.
Figure 5B:
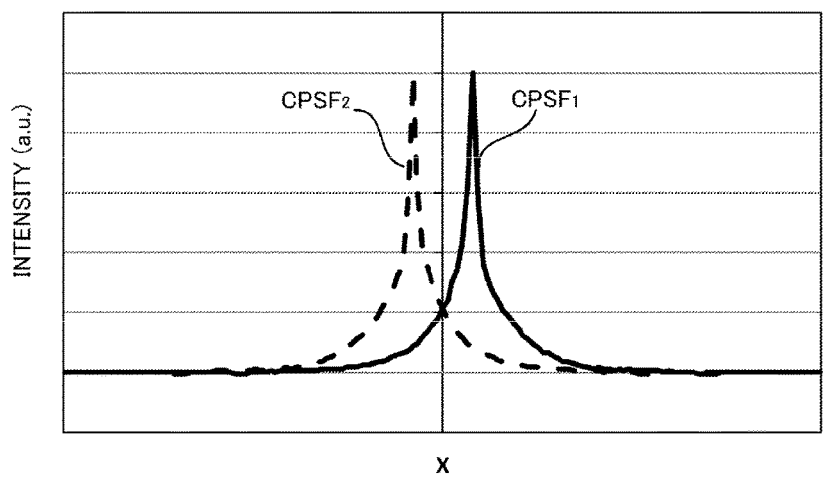

FIG. 5A shows $CPSF_1$ and $CPSF_2$, where the ordinate and abscissa indicate the x coordinate and the y coordinate respectively, and where the color is expressed whiter as the value is greater. FIG. 5B is a cross-sectional view of $CPSF_1$ and $CPSF_2$ in the x direction, where the solid line indicates $CPSF_1$, and the broken line indicates $CPSF_2$. As FIG. 5A and FIG. 5B show, the profiles of $CPSF_1$ and $CPSF_2$ are similar. The corrected signals $CS_1$ and $CS_2$ are signals of which profiles are similar, and the shift amount can be calculated at high precision. Therefore the depth to the object can be calculated at high precision in the later mentioned depth calculation step. The phase components $PG_j$ and $FPP_j$ in Expression 8 are terms which do not contribute to the profiles, hence the corrected signals $CS_1$ and $CS_2$ become signals of which profiles are similar to each other. The corrected signal $CS_j$ is displaced by the position correction component $FPP_j$ in addition to the amount of the component $PG_j$, which corresponds to the position change amount of the signal $S_j$ due to defocus.

<Shift Amount Calculation Step>

The shift amount calculation unit 43 calculates the shift amount between the corrected signals $CS_1$ and $CS_2$ in the x direction (first direction) (step S30). For the shift amount calculation processing in step S30, the same method as the tentative shift amount calculation processing in step S10 can be used. The shift amount calculation unit 43, that executes the shift amount calculation step S30, corresponds to the second calculation unit according to the present invention.
<Depth Calculation Step>

The depth calculation unit 41 calculates the depth information on the depth to the object based on the shift amount calculated from the corrected signals $CS_1$ and $CS_2$ (step S40). The depth calculation unit 41 determines the defocus amount from the determined shift amount, and calculates the depth to the object from the defocus amount and the imaging relationship of the imaging optical system 20. The defocus amount $\Delta L$ can be calculated by the following Expression 10, for example.
[Math. 6]

$$\Delta L = Ka \cdot d \quad (10)$$

Here d denotes a shift amount, and Ka denotes a conversion coefficient. The conversion coefficient Ka is a coefficient which has a same value regardless the value of the shift amount calculated by the shift amount calculation unit 43, and has a different value depending on the image height. The conversion coefficient Ka does not depend on the value of the shift amount because the image is displaced in the image signal correction processing so that the relationship between the shift amount and the defocus amount becomes linear. The conversion coefficient Ka may be a value that is different depending on the image height.

The defocus amount can easily be changed to the depth to the object in the real space using the imaging relationship of the imaging optical system, hence the defocus amount can be regarded as the depth information on the depth to the object. As the depth information on the depth to the object, the depth calculation unit 41 may output the defocus amount or may output the depth in the real space. The depth information output from the depth calculation unit 41 may be a relative depth from the focus position, or may be the absolute depth from the imaging apparatus during photographing. The relative depth or the absolute depth may be a depth on the image plane side or a depth on the object side. The depth may be expressed as a depth in the real space, or may be expressed as a quantity that can be converted into the depth in the real space, such as the defocus amount and image shift amount.

By this depth detection method, the depth to the object can be calculated at high-speed and high precision.
<Method for Determining Position Correction Component in Image Signal Correction Filter>

A method for determining a position correction component ($FPP_j$) of the image signal correction filter according to this embodiment will be described in detail.

Figure 6:
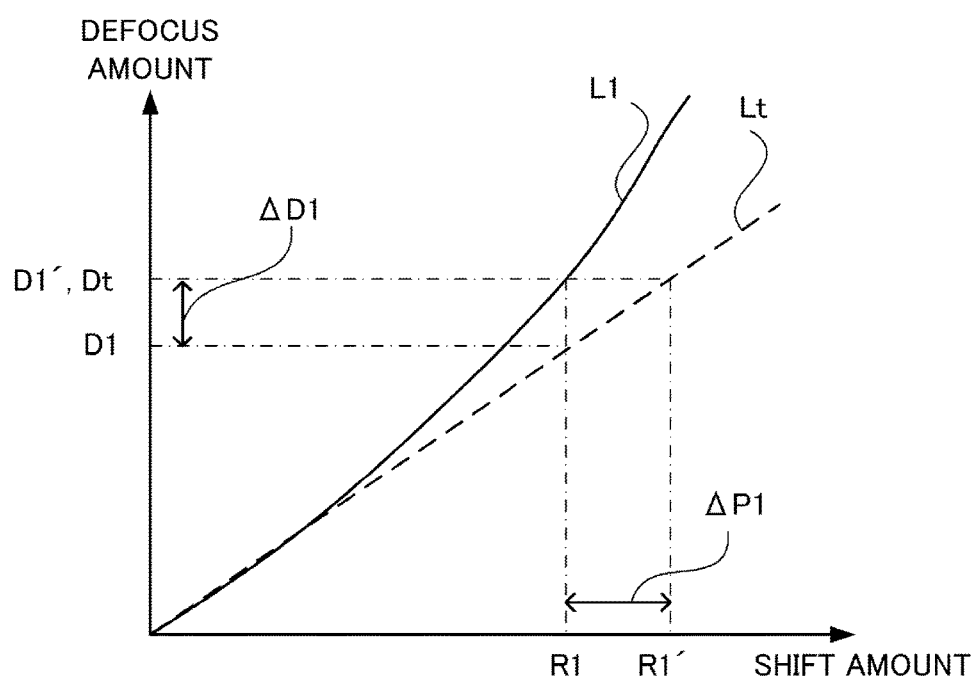
FIG. 6 is a diagram depicting a principle of the depth detection method according to Embodiment 1.

FIG. 6 is a diagram depicting a relationship of the shift amount and defocus amount. The relationship of the shift amount between the signals $S_1$ and $S_2$ and the defocus amount in the depth detection apparatus 40 is not constant. The angle range of the luminous flux that enters the pixel 13 fluctuates, and transmittance distribution on the pupil fluctuates depending on the defocus amount and the image height of the imaging optical system 20. If the transmittance distribution on the pupil fluctuates, the base line length fluctuates, and the conversion coefficient (relationship of the shift amount and defocus amount) fluctuates. The solid line L1 in FIG. 6 is a line indicating the relationship of the shift amount between the image signals $S_1$ and $S_2$ and the defocus amount at a certain image height. If the conversion coefficient fluctuates, the solid line L1 changes in a complicated way.

The broken line Lt in FIG. 6, on the other hand, is a line indicating the relationship of the shift amount and defocus amount in the case when the shift amount calculated from the signals $S_1$ and $S_2$ is converted into the defocus amount using a conversion coefficient which is constant regardless the value of the shift amount. The present description shows an example using a conversion coefficient Ka which is calculated from the relationship of the defocus amount and shift amount when the defocus amount is small.

The shift amount calculated from the signals $S_1$ and $S_2$ acquired under the photographing conditions with the defocus amount Dt is R1. If this shift amount R1 is converted into the defocus amount using the conversion coefficient Ka, D1 is acquired as the defocus amount. In other words, conversion error $\Delta D1$ (=Dt−D1) is generated.

In this embodiment, position correction to displace an image using the image signal correction filter is performed, so that the fluctuation of the conversion coefficient, which depends on the shift amount, is reduced. By displacing the position of the image by the displacement amount $\Delta P1$ corresponding to the conversion error $\Delta D1$ using the image signal correction filter, the error caused by the fluctuation of the conversion coefficient can be reduced.

The displacement amount $\Delta P$ when R is acquired as the tentative shift amount at a certain image height X is normally determined using the following expression: $\Delta P = Lx(R)/Ka - R$.

Here Lx is a function to correspond the shift amount between the image signals $S_1$ and $S_2$ and the defocus amount at the image height X, and Ka is the conversion coefficient of Expression 10. The relationship Lx of the shift amount and the defocus amount at each image height can be acquired in advance by actual measurement or by numerical calculation. Note that the conversion coefficient Ka is normally a value corresponding to the image height.

In the filter generation processing in step S21, the filter generation unit 44 generates a filter that has the displacement amount $\Delta P$ acquired in this way as the displacement component (position correction component FPP). The displacement of the image signal may be provided for only one of the signals $S_1$ and $S_2$, or may be provided to both the signals $S_1$ and $S_2$. In other words, the displacement amount (position correction component) of each filter may be arbitrary only if the signals $S_1$ and $S_2$ are relatively displaced by the displacement amount $\Delta P1$ by the filters $ICF_1$ and $ICF_2$.

By this image signal correction processing, the shift amount calculated using the corrected signal (e.g. shift amount calculated from the corrected signal $CS_1$ and the signal $S_2$ in the case of displacing only the signal $S_1$) becomes R1'. If this shift amount is converted into the defocus amount using the conversion coefficient Ka, a value D1' close to the actual defocus amount Dt can be acquired. Further, by correcting the image profile in the image signal correction processing, the shift amount of the corrected signal can be detected at high precision.

Figure 7:
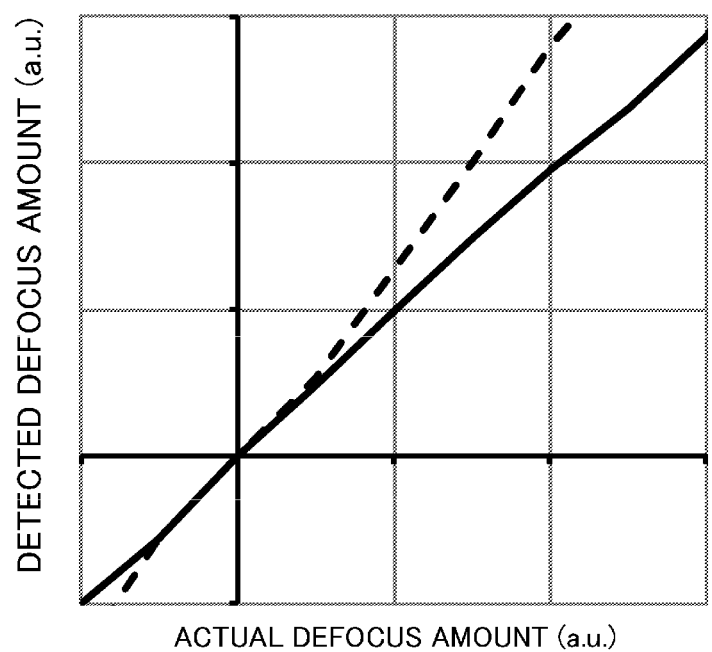
FIG. 7 is a diagram depicting an effect of the depth detection method according to Embodiment 1.

FIG. 7 is a diagram depicting an effect of the image signal correction processing according to this embodiment. In FIG. 7, the solid line indicates the defocus amount that is acquired when the image signal correction step is executed, and the broken line indicates the defocus amount that is acquired when the correction step is not executed. The abscissa indicates the actual defocus amount, and the ordinate indicates the detected defocus amount. As shown here, the defocus amount close to the actual value is detected by executing the image signal correction step. By correcting the profile and position of the image in the image signal correction processing, the calculation error and conversion error of the shift amount can be reduced, and depth can be detected at high precision. Furthermore, the processing to calculate the conversion coefficient according to the shift amount can be omitted and processing speed can be increased. The conversion coefficient fluctuates more as the defocus amount is larger. If the depth detection apparatus of Embodiment 1 is used, depth can be detected at high-speed and high precision, especially when the defocus amount is large.

<Other Image Signal Correction Filters>

The image signal correction filter ICF may be a filter that has only the phase term FP. In other words, the image signal correction filter ICF may use a filter to correct only the phase in the frequency space, as shown in Expression 11.

[Math. 7]

$$ICF_j = FFT^{-1}[\exp(i \cdot FP_j)] \tag{11}$$

The filter expressed by Expression 11 is also a filter based on $OTF_1$ and $OTF_2$. The profile and position of the first signal $S_1$ can also be corrected using this type of filter, whereby the above mentioned effect of reducing the shift amount calculation error and conversion error can be acquired.

Instead, the image signal correction filter ICF may be a filter that corrects only the position, as shown in Expression 12.

[Math. 8]

$$ICF_j = FFT^{-1}[\exp(i \cdot FPP_j)] \tag{12}$$

If this type of filter is used, the position of the first signal $S_1$ can be corrected, whereby the above mentioned effect of reducing the conversion error can be acquired.

Instead, the filters $ICF_1$ and $ICF_2$ may be the filters expressed by the following Expressions 13 to 17.

[Math. 9]

$$ICF_j = FFT^{-1}[FM_j \cdot \exp(i \cdot FP_j)] \tag{13}$$

$$FM_1 = MTF_2 \tag{14}$$

$$FPS_1 = PTF_2 - PG_2 \tag{15}$$

$$FM_2 = MTF_1 \tag{16}$$

$$FPS_2 = PTF_1 - PG_1 \tag{17}$$

The corrected signal $CS_j$ generated in the image signal correction processing is expressed by Expressions 18 and 19 using Expression 2 and Expressions 13 to 17.

[Math. 10]

$$CS_1 = S_1 * ICF_1 = FFT^{-1}[FFT[f] \cdot MTF_1 \cdot MTF_2 \cdot \exp[i(PTF_1 + PTF_2 - PG_2 + FPP_1)]] \tag{18}$$

$$CS_2 = S_2 * ICF_2 = FFT^{-1}[FFT[f] \cdot MTF_1 \cdot MTF_2 \cdot \exp[i(PTF_1 + PTF_2 - PG_1 + FPP_2)]] \tag{19}$$

The profiles of the corrected signals are determined by the amplitude components $MTF_1$ and $MTF_2$, and the phase components $PTF_1$ and $PTF_2$, hence the profiles of the corrected signals $CS_1$ and $CS_2$ are similar to each other. The position of the signal $CS_j$ is displaced by the position correction component $FPP_j$ in addition to the phase $PG_j$ corresponding to the positional change amount due to defocus of each signal.

Instead, the image signal correction processing may be performed only for one of the signals $S_1$ and $S_2$. For example, the filter ICF used for the signal $S_1$ is created based on the reciprocal of the optical transfer function $OTF_1$ and the optical transfer function $OTF_2$. ICF is a function given by the product of the reciprocal of $OTF_1$ and $OTF_2$ ($OTF_2/OTF_1$), to which the phases $PG_1$, $PG_2$ and FPP are added, in the frequency space. The image signal correction filter ICF is expressed by the following Expressions 20 to 23.

[Math. 11]

$$ICF = FFT^{-1}[FM \cdot \exp(i \cdot FP)] \tag{20}$$

$$FM = MTF_2/MTF_1 \tag{21}$$

$$FP = FPS + FPP \tag{22}$$

$$FPS = PTF_2 - PTF_1 - PG_2 + PG_1 \tag{23}$$

The corrected signal $CS_1$ is expressed by Expression 24 using Expression 2 and Expressions 20 to 23.

[Math. 12]

$$CS_1 = S_1 * ICF = FFT^{-1}[FFT[f] \cdot MTF_2 \cdot \exp(PTF_2 - PG_2 + PG_1 + FPP))] \tag{24}$$

Since the phase components $PG_1$, $PG_2$ and $FPP_j$ are components that do not contribute to the profile, the signals $CS_1$ and $S_2$ have similar profiles. $PG_2$ is offset by the positional change component included in $PTF_2$. The position of the signal $CS_1$ is displaced by the position correction component FPP in addition to the component $PG_1$, which corresponds to the positional change amount due to defocus of the signal $S_1$. Both the profile and the position can be corrected simply by performing the image signal correction processing on one of the image signals (first signal $S_1$). Therefore the calculation load of the image signal correction processing can be decreased, and high-speed pre-processing becomes possible. If the image signal correction processing is performed only on one of the image signals (e.g. first signal $S_1$), the shift amount between the corrected image signal (e.g. signal $CS_1$) and the other image signal (e.g. second signal $S_2$), on which the image signal correction processing was not performed, is determined in step S30.

By using such a filter, the differences between the image profiles can be reduced as mentioned above, and calculation error of the shift amount can be decreased. Furthermore, the conversion error can be reduced by providing an appropriate position correction component to the original signal, even if the conversion coefficient correction processing is not performed, and depth can be measured at high-speed and high precision.

In this embodiment, the processing method for generating the corrected signal by convolutional integration of the filter on the signal in the real space was shown, but the image signal correction processing may be performed in the frequency space. In this case, the signal processing unit 42 is configured to perform the following processing. First the file data (data inside the parenthesis of the inverse Fourier transform $FFT^{-1}$ in Expression 4) in the frequency space is held in advance. Then the acquired signal $S_j$ is Fourier-transformed whereby the corrected signal $FS_j$ in the frequency space is generated. By multiplying the corrected signal $FS_j$ by the filter and performing inverse Fourier transform, the corrected signal $CS_j$ can be generated. When the filtering is performed, the calculation load can be reduced compared with performing the convolutional integration, whereby depth can be measured at high-speed and high precision.

Each transfer function constituting the filter ICF need not be the above mentioned function, but may be a function approximated as another function. A function generated by approximating each transfer function as a polynomial or the like may be used. By generating the image signal correction filter ICF using these methods as well, the above mentioned effect can be acquired.

<Modification of Depth Calculation Step>

For example, the depth L to the object may be directly calculated using the conversion coefficient K which connects the shift amount d and the object depth L, as shown in Expression 25. In Expression 25, Ka is a conversion coefficient, and has a same value regardless the value of the shift amount detected in the shift amount calculation step. Therefore as mentioned above, the coefficient calculation processing can be omitted, and the depth may be calculated high-speed.

[Math. 13]

$$L = Ka \cdot d \quad (25)$$

Instead, the defocus amount $\Delta L$ may be calculated using Expression 26, so that the object depth is calculated from the defocus amount $\Delta L$. Here H denotes a distance between the exit pupil 21 and the imaging device 10. By using this expression, the defocus amount and the distance can be calculated more accurately.

[Math. 14]

$$\Delta L = \frac{d \cdot H}{K1 - d} \quad (26)$$

<Depth Measurement Result>

The depth measurement result by the depth detection apparatus of the present invention can be used for, for example, detecting the focal point of the imaging optical system. By the depth detection apparatus of the present invention, the depth to the object can be measured at high-speed and high precision, and the shift amount between the object and the focal position of the imaging optical system can be detected. By controlling the focal position of the imaging optical system, the focal position is set to the object at high-speed and high precision. The depth detection apparatus of this embodiment can be used for an imaging apparatus, such as a digital still camera and a digital video camera, and the focal point of the optical system can be detected based on the depth detection result of the depth detection apparatus. Furthermore, a depth map can be generated by calculating the depth at a plurality of positions on the imaging device 10 using the depth detection apparatus of the present invention.

(Embodiment 2)

In this embodiment, it is described that pre-processing performed using a filter will reduce the calculation error and conversion error of the shift amount that is generated corresponding to the image height, whereby the depth can be measured at high-speed and high precision. Differences of this embodiment from Embodiment 1 are: the phase correction amount of the filter that is generated in the filter creation step; and the conversion coefficient used in the depth calculation step. The rest of the configuration is the same as Embodiment 1, hence the description thereof is omitted.

In the filter creation step (step S21) in FIG. 4B, the filter generation unit 44 creates an image signal correction filter based on the tentative shift amount calculated in step S10 and the image height information. For the filter, Expressions 4 to 7 or Expressions 13 to 17 or Expressions 20 to 23 can be used, and the phase component $FPP_j$, which is a position correction amount, is different from Embodiment 1. The phase component $FPP_j$ of this embodiment is created according to a relationship of the defocus amount and the shift amount at each image height, and a conversion coefficient which is used in the depth calculation step. Just like Embodiment 1, each expression may be transformed to another expression form. Any such transformed expression should be included in the embodiment of the filter according to the present invention. In the corrected signal generation step (step S22), the filter is used for the signal, and the corrected signal is generated.

The depth calculation unit 41 calculates a depth to the object based on the shift amount calculated from the corrected signal. For example, the object depth can be calculated using Expression 27. The conversion coefficient Kb used here is a coefficient which has a same value regardless the image height, and has a different value depending on the value of the shift amount calculated by the shift amount calculation unit 43. By this depth detection method, the depth to the object can be calculated at high-speed and high precision. The conversion coefficient Kb may be a value that is different depending on the shift amount.

[Math. 15]

$$\Delta L = Kb \cdot d \quad (27)$$

Figure 8:
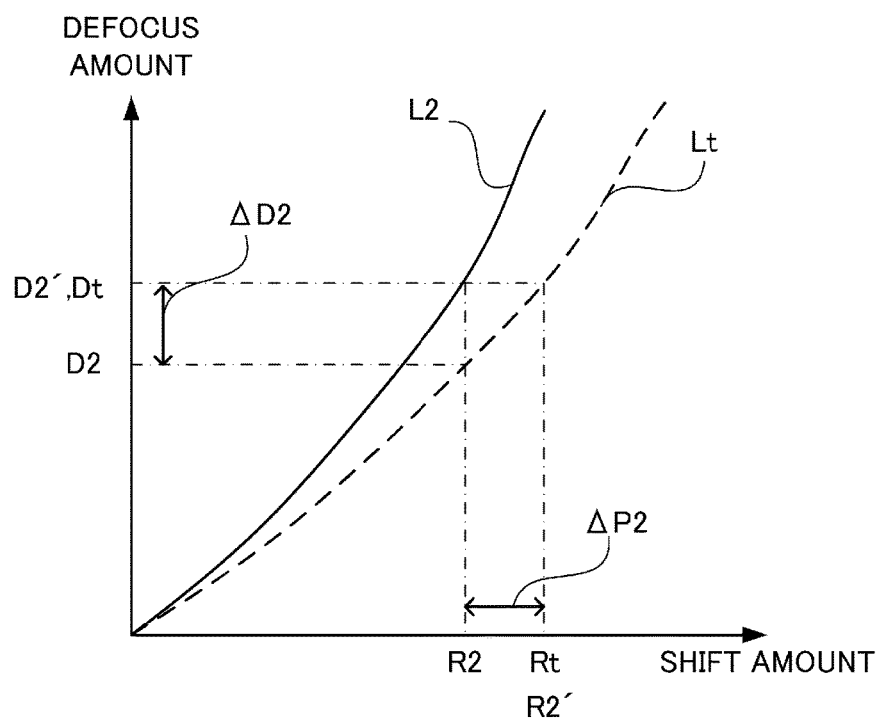
FIG. 8 is a diagram depicting a principle of the depth detection method according to Embodiment 2.

FIG. 8 is a diagram depicting the relationship of the shift amount and the defocus amount. In FIG. 8, the broken line Lt and the solid line L2 are lines indicating the relationship of the defocus amount and the shift amount at the image heights X1 and X2 respectively. When the defocus amount is Dt, the shift amounts calculated by the signals S1 and S2 at the image heights X1 and X2 are Rt and R2 respectively.

Here conversion between the defocus amount and the shift amount, using a constant conversion coefficient regardless the image height, as shown in Expression 27, is considered. For example, it is assumed that the conversion coefficient based on the relationship of the defocus amount and the shift amount at the image height X1 is used as the conversion coefficient Kb in Expression 27. In this case, the conversion between the defocus amount and the shift amount is performed according to the broken line Lt in FIG. 8. Therefore the shift amounts Rt and R2 are converted into the defocus amounts Dt and D2 respectively, and the conversion error $\Delta D2$ (=Dt−D2) is generated at the image height X2.

Therefore in this embodiment, position correction to displace an image is performed using an image signal correction filter so that the fluctuation of the conversion coefficient depending on the image height is reduced. If the position of the image is displaced by the displacement amount $\Delta P2$ corresponding to the above mentioned conversion error $\Delta D2$ using the image signal correction filter, errors generated by the fluctuation of the conversion coefficient can be reduced.

Generally the displacement amount $\Delta P$, when R is acquired as the tentative shift amount at the image height X, can be determined by the following expression: $\Delta P = Lt^{-1}(Lx(R)) - R$.

Here Lx is a function that corresponds the shift amount between the image signals S1 and S2 and the defocus amount at the image height X, and $Lt^{-1}$ is an inverse function of the function given by Expression 27. The relationship Lx of the shift amount and the defocus amount at each image height can be acquired in advance by actual measurement or by numerical calculation. Note that the conversion coefficient Kb in Expression 27 is normally a value corresponding to the shift amount.

In the filter generation processing in step S21, the filter generation unit 44 generates a filter having the displacement amount $\Delta P$ acquired in this way as the displacement component (position correction component FPP). For the displacement of the image signal, only one of the signals S1 and S2 may be displaced, or both the signals S1 and S2 may be displaced. In other words, the displacement amount of each filter (position correction component) can be arbitrary only if the signals S1 and S2 are relatively displaced by the displacement amount ΔP2 using the filters $ICF_1$ and $ICF_2$.

By this image signal correction processing, the shift amount calculated using the corrected signal (e.g. shift amount calculated from the corrected signal CS1 and the signal S2 if only the signal S1 is displaced) becomes R2'. If the shift amount is converted into the defocus amount using the conversion coefficient Kb, a value D2', which is close to the actual defocus amount Dt, can be acquired. Further, by correcting the image profile in the image signal correction processing, the shift amount of the corrected signal can be detected at high precision.

By correcting the profile and the position of the image in the image signal correction processing, the shift amount calculation error and conversion error, when converting from the shift amount into the defocus amount, can be reduced, and the depth can be detected at high precision. Further, the processing to calculate the conversion coefficient corresponding to the image height can be omitted, and processing speed can be increased. The conversion coefficient greatly fluctuates at the peripheral image height. By using the depth detection apparatus of Embodiment 2, depth can be detected at high-speed and high precision, particularly in the peripheral image height.

(Embodiment 3)

In this embodiment, it is described that pre-processing performed using a filter will reduce the calculation error of the shift amount and conversion error when converting the shift amount into the defocus amount, which are generated corresponding to the defocus amount and the image height, whereby the depth can be measured at high-speed and high precision. Differences of this embodiment from Embodiment 1 are: the phase correction amount of the filter that is generated in the image signal correction filter creation step; and the conversion coefficient used in the depth calculation step. The rest of the configuration is the same as Embodiment 1, hence description thereof is omitted.

In the filter creation step (step S21) in FIG. 4B, the filter generation unit 44 creates the image signal correction filter based on the tentative shift amount calculated in step S10 and the image height information. For the filter, Expressions 4 to 7 or Expression 13 to 17 or Expression 20 to 23 may be used, and the phase component $FPP_j$, which is the position correction amount, is different from Embodiment 1. The phase component $FPP_j$ of this embodiment is created according to a relationship of the defocus amount and the shift amount at each image height, and a conversion coefficient, which is used in the depth calculation step. Just like Embodiment 1, each expression may be transformed into another expression form. Any such transformed expression should be included in the embodiment of the image signal correction filter according to the present invention. In the corrected signal generation step (step S22), the filter is used for the signal, and the corrected signal is generated.

The depth calculation unit 41 calculates a depth to the object based on the shift amount calculated from the corrected signal. For example, the object depth can be calculated using Expression 28. The conversion coefficient Kc used here is a coefficient which has a same value regardless the value of the shift amount and the image height. By this depth detection method, the depth to the object can be calculated a high-speed and high precision.

[Math. 16]

$$\Delta L = Kc \cdot d \quad (28)$$

Figure 9:
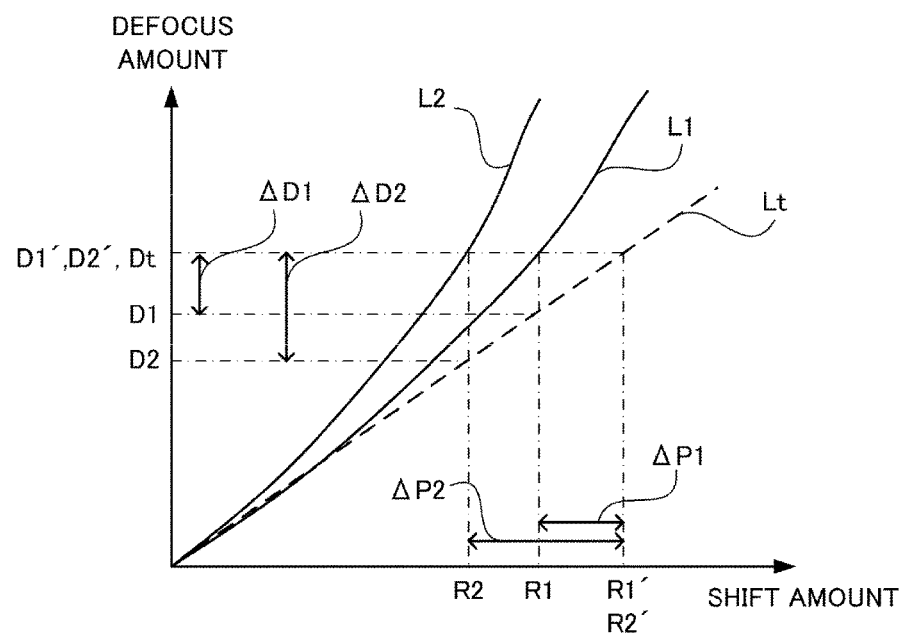
FIG. 9 is a diagram depicting a principle of the depth detection method according to Embodiment 3.

FIG. 9 is a diagram depicting the relationship of the shift amount and the defocus amount. In FIG. 9, the sold lines L1 and L2 are lines indicating the relationship of the defocus amount and the shift amount at the image height X1 and X2 respectively. The broken line Lt is a line indicating the relationship of the defocus amount and the shift amount defined by Expression 28. Here for the conversion coefficient Kc of Expression 28, a coefficient, which is calculated from the relationship of the defocus amount and the shift amount when the defocus amount is small at the image height X1, is used.

Here the conversion error between the shift amount and the defocus amount is considered. The shift amounts calculated from the signals S1 and S2 at the image heights X1 and X2 at a certain defocus amounts Dt are R1 and R2 respectively. On the other hand, the shift amounts R1 and R2 converted into the defocus amount according to the relationship of Expression 28 (broken line Lt) are D1 and D2 respectively. In other words, the conversion errors ΔD1 (=Dt−D1) and ΔD2 (=Dt−D2) are generated at the image heights X1 and X2 respectively.

Therefore in this embodiment, position correction to displace an image is performed using the image signal correction filter, so that the fluctuation of the conversion coefficient depending on the defocus amount and the image height is reduced. If the position of the image is displaced by the displacement amounts ΔP1 and ΔP2 corresponding to the above mentioned conversion errors ΔD1 and ΔD2 using the image signal correction filter, errors generated by the fluctuation of the conversion coefficient can be reduced.

Generally the displacement amount ΔP, when R is acquired as the tentative shift amount at the image height X, can be determined by the following expression: ΔP=Lx(R)/Kc−R.

Here Lx is a function that corresponds the shift amount between the image signals S1 and S2 and the defocus amount at the image height X, and Kc is a conversion coefficient in Expression 27. The relationship Lx of the shift amount and the defocus amount at each image height can be acquired in advance by actual measurement or by numerical calculation. Note that the conversion coefficient Kc is a value that does not depend on the shift amount or the image height.

In the filter generation processing in step S21, the filter generation unit 44 generates a filter having the displacement amount ΔP acquired in this way as the displacement component (position correction component FPP). For the displacement of the image signal, only one of the signals S1 and S2 may be displaced, or both of the signals S1 and S2 may be displaced. In other words, the displacement amount of each filter (position correction component) can be arbitrary only if the signals S1 and S2 are relatively displaced by the displacement amount ΔP using the filters $ICF_1$ and $ICF_2$.

By correcting the profile and the position of the image in this image signal correction processing, the shift amount calculation error and the conversion error can be reduced, and depth can be detected at high precision. Further, the processing to calculate the conversion coefficient can be omitted depending on the value of the shift amount and the image height, and processing speed can be increased. Since the processing to calculate the conversion coefficient can be further omitted compared with Embodiments 1 and 2, processing speed can be increased even more. If the focal length and the diaphragm of the imaging optical system 20 change, the pupil transmittance distribution fluctuates, and the baseline length and the conversion coefficient also fluctuate. Hence the image signal correction processing may be performed so as to provide the above mentioned displacement component to each signal corresponding to the focal length and the diaphragm. Then a similar effect can be demonstrated.

(Embodiment 4)

The above mentioned embodiments are examples of calculating the depth to the object, but the present invention can also be adapted to a parallax detection apparatus that detects parallax corresponding to the shift amount. For example, using the parallax detection apparatus, processing to extract an object image near the focal position from the image based on the shift amount can be performed. The parallax may be a shift amount between two signals, or may be a physical quantity related thereto.

If the parallax detection apparatus has a configuration that includes a parallax calculation unit to calculate the parallax corresponding to the shift amount of the two signals, instead of the depth calculation unit 41 of the depth detection apparatus 40 in Embodiment 1, the rest of the configuration can be the same as the depth detection apparatus 40. Further, the parallax detection apparatus may include an extraction unit that extracts an object image having a predetermined parallax from the image based on the [measured] parallax (shift amount).

The parallax detection method according to this embodiment can be the same as FIG. 4A and FIG. 4B, except that parallax calculation processing is performed instead of the depth calculation processing S30 in the flow chart in FIG. 4A. To calculate parallax, the defocus amount may be calculated using Expression 10, or the shift amount of the signals may be calculated, or a related physical quantity may be calculated.

In this embodiment as well, the filter processing is performed only on either one of the first signal and the second signal using the image signal correction filter, hence parallax can be detected at high-speed and high precision.

This parallax detection apparatus may be used as a part of an imaging apparatus, just like the case of the depth detection apparatuses according to Embodiments 1 to 3.

(Other Embodiments)

The present invention includes a computer program, in addition to the depth detection apparatus and the parallax detection apparatus. The computer program of this embodiment is for causing a computer to execute predetermined steps to calculate the depth or parallax.

The program of this embodiment is installed on a computer of an imaging apparatus, such as a digital camera, which includes the depth detection apparatus and/or the parallax detection apparatus. The above mentioned functions are implemented by the computer executing the installed program, and the depth or parallax can be detected at high-speed and high precision.

The present invention can also be carried out by processing in which a program to implement one or more function(s) of the above mentioned embodiments is supplied to the system or an apparatus via a network or storage medium, and at least one processor of a computer in the system or the apparatus reads and executes the program. The present invention can also be carried out by a circuit (e.g. ASIC) which implements one or more of the above functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-236881, filed on Nov. 21, 2014, which is hereby incorporated by reference herein in its entirety.

The invention claimed is:

1. A depth detection apparatus that detects depth information on a depth to an object on the basis of a first signal corresponding to luminous flux that passed through a first pupil region of an exit pupil of an imaging optical system and a second signal corresponding to luminous flux that passed through a second pupil region, which is different from the first pupil region,
the depth detection apparatus comprising:
a first calculation unit adapted to calculate a first shift amount, which is a positional shift amount between the first signal and the second signal;
a signal processing unit adapted to generate a corrected signal by performing filter processing on at least one of the first signal and the second signal, the filter processing being performed to relatively displace the first signal and the second signal by a displacement amount corresponding to the first shift amount; and
a second calculation unit adapted to calculate a second shift amount, which is a positional shift amount between the first signal and the second signal, which are both filtered in the filter processing, or between signals, one of which is filtered in the filter processing and the other one of which is unfiltered.

2. The depth detection apparatus according to claim 1, wherein
the displacement amount is determined so as to reduce error between a defocus amount acquired by converting the first shift amount using a conversion coefficient which does not depend on the defocus amount and a defocus amount acquired by a predetermined relationship between a defocus amount and the first shift amount.

3. The depth detection apparatus according to claim 2, further comprising a depth calculation unit adapted to convert the second shift amount into the defocus amount using the conversion coefficient which does not depend on the defocus amount.

4. The depth detection apparatus according to claim 1, wherein
the displacement amount is determined so as to reduce error between a defocus amount acquired by converting the first shift amount using a conversion coefficient which does not depend on a position on an imaging device to which the luminous flux reaches, and a defocus amount acquired by a predetermined relationship between a defocus amount and the first shift amount.

5. The depth detection apparatus according to claim 4, further comprising a depth calculation unit adapted to convert the second shift amount into the defocus amount using the conversion coefficient which does not depend on the position on the imaging device to which the luminous flux reaches.

6. The depth detection apparatus according to claim 1, wherein
the displacement amount is determined so as to reduce error between a defocus amount acquired by converting the first shift amount using a conversion coefficient, which neither depends on a position on an imaging device to which the luminous flux reaches nor on the defocus amount, and a defocus amount acquired by the predetermined relationship between a defocus amount and the first shift amount.

7. The depth detection apparatus according to claim 6, further comprising a depth calculation unit adapted to convert the second shift amount into the defocus amount using the conversion coefficient which neither depends on the position on the imaging device to which the luminous flux reaches nor on the defocus amount.

8. The depth detection apparatus according to claim 1, wherein
the filter processing includes processing to relatively deform the first signal and the second signal according to the first shift amount.

9. The depth detection apparatus according to claim 8, wherein
the signal processing unit applies a filter, of which phase terms are a first phase component that provides the deformation and a second phase component that provides the displacement, to at least one of the first signal and the second signal,
the first phase component has a different value in real space, depending on a spatial frequency, and
the second phase component has a constant valine space regardless the spatial frequency.

10. The depth detection apparatus according to claim 8, wherein
the filter used for the filter processing is generated based on an optical transfer function corresponding to the first signal, or an optical transfer function corresponding to the second signal.

11. The depth detection apparatus according to claim 8, wherein the signal processing unit performs the filter processing only on the first signal, and
the filter used for the filter processing is generated based on a reciprocal of the optical transfer function corresponding to the first signal and the optical transfer function corresponding to the second signal.

12. The depth detection apparatus according to claim 1, further comprising a filter generation unit adapted to store the predetermined relationship between the defocus amount and the first shift amount in advance, and generate a filter used for the filter processing based on this relationship and the first image shift amount.

13. An imaging apparatus, comprising:
an imaging optical system;
an imaging device that acquires a first signal and a second signal corresponding to luminous flux that passed through a first pupil region and a second pupil region of the imaging optical system respectively; and
the depth detection apparatus according to claim 1.

14. A depth detection method performed by a depth detection apparatus that detects depth information on a depth to an object on the basis of a first signal corresponding to luminous flux that passed through a first pupil region of an exit pupil of an imaging optical system, and a second signal corresponding to luminous flux that passed through a second pupil region which is different from the first pupil region,
the depth detection method comprising:
a first calculation step of calculating a first shift amount, which is a positional shift amount between the first signal and the second signal;
a signal processing step of generating a corrected signal by performing filter processing on at least one of the first signal and the second signal, the filter processing being performed to relatively displace the first signal and the second signal by a displacement amount corresponding to the first shift amount; and
a second calculation step of calculating a second shift amount between the first signal and the second signal, which are both filtered in the filter processing, or between signals one of which is filtered in the filter processing and the other one of which is unfiltered.

15. A non-transitory computer-readable medium storing a computer program, when run by a computer, causing the computer to execute:
a first calculation step of calculating a first shift amount, which is a positional shift amount between a first signal a the second signal, wherein the first signal corresponds to luminous flux that passed through a first pupil region of an exit pupil of an imaging optical astern and the second signal corresponds to luminous flux that passed through a second pupil region which is different from the first pupil region;
a signal processing step of generating a corrected signal by performing filter processing on at least one of the first signal and the second signal, the filter processing being performed to relatively displace the first signal and the second signal by a displacement amount corresponding to the first shift amount; and
a second calculation step of calculating a second shift amount between the first signal and the second signal, which are both filtered in the filter processing, or between signals one of which is filtered in the filter processing and the other one of which is unfiltered.

* * * * *